United States Patent
Bae et al.

(10) Patent No.: US 7,656,588 B2
(45) Date of Patent: Feb. 2, 2010

(54) LIQUID FOR LIQUID LENS WITH HIGH RELIABILITY

(75) Inventors: Jae Young Bae, Kyungki-do (KR); Hee Sung Choi, Kyungki-do (KR); Ha Yong Jung, Kyungki-do (KR); Jong Yun Kim, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 510 days.

(21) Appl. No.: 11/505,811

(22) Filed: Aug. 18, 2006

(65) Prior Publication Data

US 2007/0040146 A1 Feb. 22, 2007

(30) Foreign Application Priority Data

Aug. 19, 2005 (KR) ............. 10-2005-0076450

(51) Int. Cl.
*G02B 1/06* (2006.01)
(52) U.S. Cl. .................................... 359/665
(58) Field of Classification Search .......... 359/665–666
See application file for complete search history.

(56) References Cited

U.S. PATENT DOCUMENTS

2006/0209422 A1* 9/2006 Renders et al. ............. 359/665

2007/0177276 A1* 8/2007 Liogier D'ardhuy et al. ..... 359/666
2007/0179200 A1* 8/2007 Liogier D'Ardhuy et al. .. 516/9

FOREIGN PATENT DOCUMENTS

JP 1-140118 A 6/1989
WO WO 2004/099845 11/2004

OTHER PUBLICATIONS

United Kingdom Patent Office Search Report mailed Dec. 15, 2007 in reference to United Kingdom Application No. GB0616412.3.

* cited by examiner

*Primary Examiner*—Jordan M. Schwartz

(57) ABSTRACT

A liquid for a liquid lens includes an electrolyte solution and an insulating solution wherein the electrolyte solution contains H2O, 1,2-propanediol and LiCl, and the insulating solution is a silicon (Si) oil and optionally contains 1,6-dibromohexane or bromobenzene as an organic additive. A liquid lens module includes a transparent cover, a case for accommodating an electrolyte solution and an insulating solution, a pair of electrodes for supplying electricity to the electrolyte solution, and an insulating film for covering one of the electrodes in contact with the electrolyte solution wherein the electrolyte solution contains H2O, 1,2-propanediol and LiCl, and the insulating solution is a silicon (Si) oil.

10 Claims, 1 Drawing Sheet

LIQUID FOR LIQUID LENS WITH HIGH RELIABILITY

RELATED APPLICATIONS

The present application is based on, and claims priority from, Korean Application No. 10-2005-0076450, filed Aug. 19, 2005, the disclosure of which is incorporated by reference herein in its entirety.

BACKGROUND OF THE INVENTION

1. Field of the Invention

The present invention relates to a liquid for a liquid lens. More specifically, the present invention relates to a liquid for a liquid lens comprising an electrolyte solution and an insulating solution, compositions of the electrolyte solution and the insulating solution, and a liquid lens module comprising the liquid for a liquid lens.

2. Description of the Related Art

A great deal of research has been concentrated on liquid lenses based on the electrowetting phenomenon since the beginning of the twenty-first century. Liquid lenses are currently used in various application fields. "Electrowetting" is a phenomenon wherein the surface tension of a liquid is altered using electrical charges present at the interface of the liquid. The electrowetting phenomenon may be utilized to handle microliquids and microparticles present in liquids.

Methods for producing liquid lenses for auto focus (A/F) using the electrowetting phenomenon have the advantages of reduced electric power consumption and miniaturization of liquid lenses, compared to conventional mechanical production methods. Based on these advantages, efforts to produce liquid lenses on an industrial scale have been rapidly made. The electrowetting phenomenon is currently utilized in a wide variety of applications, including display devices, optical devices and micro-electromechanical systems (MEMSs).

However, liquid lenses have not yet been put to practical use. Two major obstacles to the successful commercialization of liquid lenses are incomplete mechanical joining of elements and possibility of mixing between two solutions after a reliability test at a high temperature (+85° C.) for 96 hours or more.

The mechanism of the electrowetting phenomenon is not clearly established, and a liquid lens with superior high- and low-temperature reliability has not hitherto been reported. Although a number of patent applications describe mechanical constitutions of liquid lenses using the electrowetting phenomenon, they fail to disclose liquid compositions of the liquid lenses. Moreover, no mention is made in these patent applications about liquid compositions for liquid lenses that can primarily prevent the possibility of mixing between an electrolyte solution and an insulating solution at room temperature while taking into consideration the control of mixing between the two solutions arising after a reliability test at a high temperature.

Liquids for liquid lenses comprise an electrically conductive electrolyte solution and an electrically insulating solution. The two solutions must have the same density and a large difference in refractive index. In addition, the two solutions must have suitable viscosity and surface tension, which are requirements for the production and realization of lenses in a simple manner. For commercialization of liquid lenses, there must be no mixing between the two solutions after a reliability test at a high temperature (+85° C.) for 96 hours or more. However, chemical and physical reactions between the two solutions after a reliability test at a high temperature induce changes in the physical properties of the solutions, thus making it difficult to achieve high reliability of lenses.

SUMMARY OF THE INVENTION

The present inventors have earnestly and intensively conducted research to develop an electrolyte solution and an insulating solution capable of satisfying the requirements for a liquid for a liquid lens and preventing mixing between the two solutions even after a reliability test, and have finally achieved the present invention.

It is one object of the present invention to provide a liquid for a liquid lens using two solutions with different properties that ensures superior high- and low-temperature reliability and can be commercialized while clearly demonstrating the principle of mixing between the two solutions essentially arising after a reliability test.

It is yet another object of the present invention to provide a liquid lens module comprising the liquid for a liquid lens.

In accordance with one aspect of the present invention, there is provided a liquid for a liquid lens comprising an electrolyte solution and an insulating solution separated from each other by an interface wherein the electrolyte solution contains $H_2O$, 1,2-propanediol and LiCl, and the insulating solution is a silicon (Si) oil and optionally contains 1,6-dibromohexane or bromobenzene as an organic additive.

In accordance with another aspect of the present invention, there is a liquid lens module comprising a transparent cover, a case for accommodating an electrolyte solution and an insulating solution, a pair of electrodes for supplying electricity to the electrolyte solution, and an insulating film for covering one of the electrodes in contact with the electrolyte solution wherein the electrolyte solution contains $H_2O$, 1,2-propanediol and LiCl, and the insulating solution is a silicon (Si) oil.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
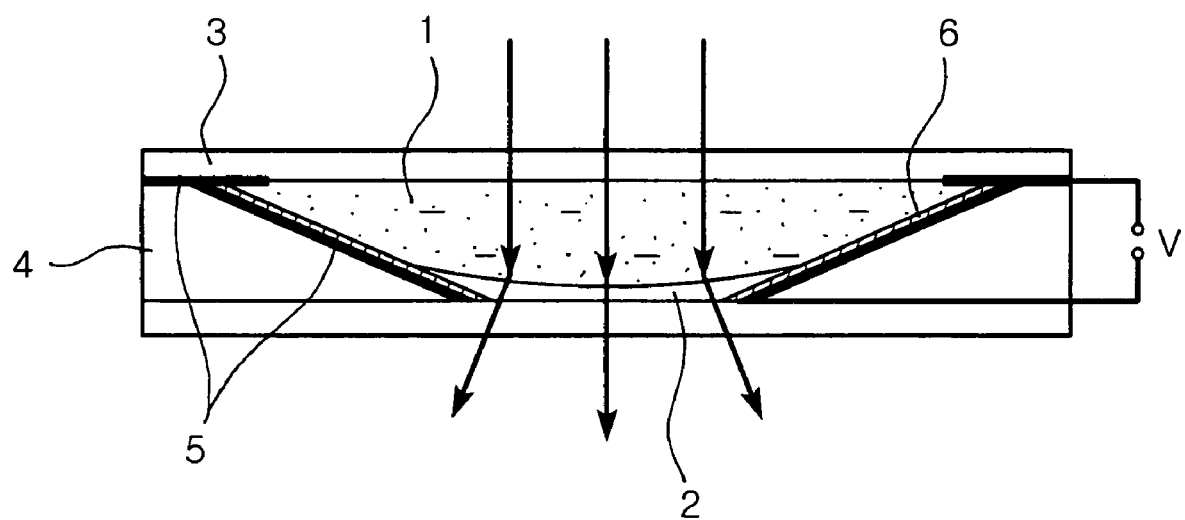
FIG. 1 is a cross-sectional view schematically showing the structure of a liquid lens module using a liquid for a liquid lens according to the present invention.

The present invention will now be described in greater detail.

Until now, no liquid for a liquid lens has been suggested that ensures superior high-temperature reliability (+85° C., $\geq$96 hours). This is the reason that there is no commercially available liquid lens. The present invention suggests a solution to the inherent problems of liquids for liquid lenses, i.e. mixing between an electrolyte solution and an insulating solution after a reliability test, and changes in the physical properties of the solutions resulting from the mixing, in view of an electrolyte solution.

The present invention provides a liquid for a liquid lens comprising an electrolyte solution and an insulating solution. The two solutions are separated from each other by an interface and are immiscible with each other.

The electrolyte solution contains $H_2O$, 1,2-propanediol and LiCl, and the insulating solution is a silicon (Si) oil and optionally contains 1,6-dibromohexane or bromobenzene as an organic additive.

The electrolyte solution contains water as a first electrically conductive liquid. The electrolyte solution may further contain a salt for lowering the surface energy of the water and improving rheological properties. Examples of suitable salts that can be used in the present invention include LiCl, $NH_4Cl$, NaCl, KCl, $NaNO_3$, $KNO_3$, $CaCl_2$, KBr, $MgSO_4$, $CuSO_4$, and $K_2SO_4$. The use of LiCl is preferred. In order to maximize the freezing point depression and boiling point elevation of the electrolyte solution, the salt must be highly soluble in water and have a low molecular weight. In general, it is difficult to adjust the concentration a salt having a high molecular weight and a low solubility to a desired level. LiCl is advantageous in terms of easy control of concentration in a wide range and superior low-temperature reliability, in comparison with other salts. Therefore, LiCl is the most effectively used to attain the above advantageous effects salt because it has the lowest molecular weight and is relatively highly soluble in water, whereby achieving maximization of the freezing point depression and boiling point elevation of the electrolyte solution.

An appropriate amount of the salt must be used in the electrolyte solution. When the salt is used in an excessively large amount, there arises appreciable mixing at the interface. Recent research results have revealed that when the amount of NaBr in a solution containing 3-methylpyridine, water and NaBr increases, mixing between solutions at the interface increases.

The LiCl may be used in an amount of 5 to 30% by weight and more preferably 10% by weight, based on the total weight of the electrolyte solution. The use of LiCl within the above weight range inhibits mixing between the two solutions at the interface.

The electrolyte solution may further contain. 1,2-propanediol. The addition of the 1,2-propanediol renders the density of the electrolyte solution substantially identical to that of the insulating solution and causes a difference in refractive index between the two solutions. The 1,2-propanediol also acts as a surfactant, which is thus expected to achieve a reduction in operating voltage. As a consequence, the 1,2-propanediol functions to control of the physical properties of the electrolyte solution, activate the interface, and inhibit mixing between the two solutions.

The 1,2-propanediol is preferably used in an amount of 20 to 50% by weight and more preferably of 30% by weight, based on the total weight of the electrolyte solution. When the 1,2-propanediol is used in an amount exceeding 50% by weight, the requirements for the physical properties, i.e. density and refractive index, of the electrolyte solution and the insulating solution cannot be satisfied, and as a result, the two solutions are mixed after reliability tests at high and low temperatures.

A silicon oil is used as the insulating solution which is not mixed with the electrolyte solution and forms an interface together with the electrolyte solution. Any silicon oil may be used without any particular limitation so long as it is commonly used in the art.

In general, the insulating solution may contain an organic additives. The two solutions must have the same density and a large difference in refractive index. In addition, the two solutions must have suitable viscosity and surface tension, which are requirements for the production and realization of lenses in a simple manner. The organic additives are added to satisfy these requirements for liquids for liquid lenses. Examples of suitable organic additives that can be added to the insulating solution include 1,6-dibromohexane, bromobenzene, 1,2-dichlorobenzene, 1-bromo-3-chlorobenzene, and 1,2,3,6-tetrabromo-hexane. Of these, the present inventors have focused on 1,6-dibromohexane and bromobenzene, and selected 1,6-dibromohexane or bromobenzene as the organic additive.

The amount of 1,6-dibromohexane or bromobenzene added is preferably as small as possible. Although it is most preferred not to use any organic additive, the use of the organic additive is inevitable to satisfy the requirements for liquids for liquid lenses. Therefore, it is preferred that the organic additive be used in the smallest amount necessary to satisfy the requirements for liquids for liquid lenses.

1,6-dibromohexane or bromobenzene as the organic additive may be used in an amount of 10 to 25% by weight and more preferably of 17% by weight, based on the total weight of the insulating solution. If the organic additive is used in an amount of less than 10% by weight, it is impossible to satisfy the requirements for liquids for liquid lenses. Meanwhile, if the organic additive is used in an amount of more than 25% by weight, it readily reacts with the electrolyte solution before and after a reliability test, thus causing changes in various physical properties of the final liquid for a liquid lens. Therefore, the amount of the organic additive is preferably limited to the range defined above.

Specifically, the liquids for liquid lens comprise the electrolyte solution which contains 30 to 70% by weight of $H_2O$, 20 to 50% by weight of 1,2-propanediol and 5 to 30% by weight of LiCl, and the insulating solution which is 100% of a silicon oil. In the case where the insulating solution contains 1,6-dibromohexane or bromobenzene as an organic additive, the insulating solution contains 75 to 90% by weight of a silicon oil and 10 to 25% by weight of 1,6-dibromohexane or bromobenzene. When the constituent components of the electrolyte solution and the insulating solution are within the respective ranges defined above, the physical properties of the electrolyte solution and the insulating solution satisfy the requirements for liquids for liquid lenses. In contrast, when one or more constituent components of the electrolyte solution and the insulating solution are out of the respective ranges defined above, the two solutions are unfavorably mixed after a reliability test at high temperature and unwanted by-products are formed due to excessive reactivity.

In addition, the compositions of the electrolyte solution and the insulating solution are simplified so that liquid lenses can be produced and realized in a simple manner and are suitable for commercialization. It is common to add other additives, such as an antifreezing solution, in large quantities so that the two solutions can sufficiently function as elements of a liquid lens in the temperature range of −40° C. to +85° C.

In the case where the electrolyte solution and the insulating solution have the respective compositions defined above, a liquid for a liquid lens can be produced wherein the electrolyte solution and the insulating solution have the same density and a large difference in refractive index. Gravity may render the surface of lenses asymmetrically spherical during operation of the lenses. The use of the electrolyte solution and the insulating solution having the same density enables prevention of asymmetric spherical surface. In addition, the difference in the refractive index of the electrolyte solution and the insulating solution allows a liquid lens to have a variable focus. The refractive index of the electrolyte solution may be larger than that of the insulating solution, or vice versa.

The liquid for a liquid lens according to the present invention has superior high- and low-temperature reliability. The terms "low-temperature reliability" and "high-temperature reliability" as herein used mean that even after the liquid for a liquid lens according to the present invention is exposed to a low temperature (−40° C.) for 48 hours or more and a high temperature (+85° C.) for 96 hours or more, respectively, its performance is substantially the same as that at room temperature. The liquid for a liquid lens according to the present invention has a transmittance of 95% or higher after a reliability test at a low temperature, and a transmittance of 90% or higher after a reliability test at a high temperature.

A liquid lens module can be produced using the liquid for a liquid lens according to the present invention. The liquid lens module of the present invention comprises a transparent cover 11, a case 4 for accommodating an electrolyte solution 1 and an insulating solution 2, a pair of electrodes 5 for supplying electricity to the electrolyte solution 1, and an insulating film 6 for covering one of the electrodes in contact with the electrolyte solution. Structures of liquid lenses using the electrowetting phenomenon that are well known in the art may be applied to the liquid lens module of the present invention.

The electrolyte solution 1 accommodated in the case 4 contains $H_2O$, 1,2-propanediol and LiCl, and the insulating solution 2 accommodated in the case 4 is a silicon (Si) oil. Optionally, the insulating solution 2 may contain 1,6-dibromohexane or bromobenzene.

Specifically, the electrolyte solution 1 accommodated in the case 4 contains 30 to 70% by weight of $H_2O$, 20 to 50% by weight of 1,2-propanediol and 5 to 30% by weight of LiCl; and the insulating solution 2 accommodated in the case 4 is 100% of a silicon oil. In the case where the insulating solution 2 contains 1,6-dibromohexane or bromobenzene as an organic additive, the insulating solution 2 contains 75 to 90% by weight of a silicon oil and 10 to 25% by weight of 1,6-dibromohexane or bromobenzene.

The liquid for a liquid lens and the module using the same according to the present invention ensure improved high- and low-temperature reliability, compared to conventional liquids for liquid lenses and modules using the same, thereby preventing mixing between the electrolyte solution and insulating solution.

EXAMPLES

Hereinafter, the present invention will be explained in more detail with reference to the following examples. However, these examples are given for the purpose of illustration and are not intended to limit the present invention.

General liquid lenses comprise an electrolyte solution and an insulating solution in a ratio of 4:1 to 6:1. In the present example, an electrolyte solution and an insulating solution were used in a ratio of 1:1 to prepare a liquid for a liquid lens in order to determine whether or not the liquid for a liquid lens was reliable. It will be apparent to those skilled in the art that the same results will be obtained although the liquid for a liquid lens according to the present invention is prepared by changing the ratio between an electrolyte solution and an insulating solution to an actual ratio employed to produce general liquid lenses.

Example 1

An electrolyte solution was prepared by mixing 60% by weight of $H_2O$, 30% by weight of 1,2-propanediol and 10% by weight of LiCl. An insulating solution was prepared by mixing 83% by weight of a silicon oil and 17% by weight of 1,6-dibromohexane. A liquid for a liquid lens was produced by mixing the electrolyte solution with the insulating solution in a ratio of 1:1.

The viscosity and the refractive index of the electrolyte solution and the insulating solution were measured using a pycnometer and an ABBE refractometer, respectively. A glass vial (20 ml) was filled with the electrolyte solution and the insulating solution in a ratio of 1:1.

A reliability test at a low temperature was conducted by allowing the glass vial filled with the electrolyte solution and the insulating solution to stand at −40° C. for 48 hours or more. After another glass vial filled with the electrolyte solution and the insulating solution in a ratio of 1:1 was allowed to stand at +85° C. for 96 hours or more, the transmittance of the liquid for a liquid lens was measured using a UV-visible spectrometer in the visible range. The total transmittance was measured by fixing the light beam path of each of the electrolyte solution and the insulating solution to 1 mm. The results are shown as follows.

Viscosity
Electrolyte solution: 1.08 g/cm$^3$
Insulating solution: 1.08 g/cm$^3$
Refractive index
Electrolyte solution: 1.390 $n_D^{20}$
Insulating solution: 1.500 $n_D^{20}$
Transmittance
After reliability test at low temperature=99%
After reliability test at high temperature=96%

These results indicate that the electrolyte solution and insulating solution had substantially the same viscosity and a large difference in refractive index. The transmittance obtained after the reliability test at a low temperature was the same as that at room temperature, and the transmittance obtained by the reliability test at a high temperature was substantially identical to that at room temperature. In conclusion, the liquid for a liquid lens according to the present invention satisfied the requirements as an element of liquid lenses and ensured superior high- and low-temperature reliability. Therefore, the liquid for a liquid lens according to the present invention is suitable for commercialization of liquid lenses.

Comparative Example 1

An electrolyte solution was prepared by mixing 79.8% by weight of $H_2O$, 10% by weight of ethyl alcohol, 10% by weight of glycerol and 0.2% by weight of $Na_2SO_4$. An insulating solution was prepared by mixing 90% by weight of a silicon oil with 10% by weight of 1-bromo-3-chrolobenzene.

A liquid for a liquid lens was prepared in the same manner as in Example 1. After reliability tests at low and high temperatures were conducted, the transmittance of the liquid for a liquid lens was measured. The results are shown as follows.

Transmittance
After reliability test at low temperature=frozen at −40° C.
After reliability test at high temperature=73%

These results show that the liquid was frozen in the temperature range for the reliability test at a low temperature and the transmittance was greatly decreased after the reliability test at a high temperature.

As apparent from the foregoing, the electrolyte solution and the insulating solution used in the liquid for a liquid lens according to the present invention satisfy the requirements for liquid lenses. In addition, since the liquid for a liquid lens according to the present invention ensures superior low- and high-temperature reliability, it can inhibit mixing between the two solutions after a reliability test. Therefore, the liquid for a liquid lens according to the present invention is suitable for use as an element of liquid lenses and can thus be commercialized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A liquid for a liquid lens comprising:
an electrolyte solution and an insulating solution, wherein the electrolyte solution contains $H_2O$, 1,2-propanediol and LiCl, and the insulating solution is a silicon (Si) oil and the electrolyte solution contains 30 to 70% by weight of $H_2O$, 20 to 50% by weight of 1,2-propanediol and 5 to 30% by weight of LiCl, based on the total weight of the electrolyte solution.

2. The liquid according to claim 1, wherein the insulating solution contains 1,6-dibromohexane or bromobenzene.

3. A liquid for a liquid lens comprising:
an electrolyte solution and an insulating solution, wherein the electrolyte solution contains $H_2O$, 1,2-propanediol and LiCl, and the insulating solution is a silicon (Si) oil and the electrolyte solution contains 60% by weight of $H_2O$, 30% by weight of 1,2-propanediol and 10% by weight of LiCl, based on the total weight of the electrolyte solution.

4. A liquid for a liquid lens comprising:
an electrolyte solution and an insulating solution wherein the electrolyte solution contains $H_2O$, 1,2-propanediol and LiCl, and the insulating solution is a silicon (Si) oil the insulating solution contains 1.6 dibromohexane or bromobenzene, the electrolyte solution contains 30 to 70% by weight of $H_2O$, 20 to 50% by weight of 1,2-propanediol and 5 to 30% by weight of LiCl, based on the total weight of the electrolyte solution; and the insulating solution contains 75 to 90% by weight of a silicon oil and 10 to 25% by weight of 1,6-dibromohexane or bromobenzene, based on the total weight of the insulating solution.

5. A liquid for a liquid lens comprising:
an electrolyte solution and an insulating solution, wherein the electrolyte solution contains $H_2O$, 1,2-propanediol and LiCl, and the insulating solution is a silicon (Si) oil, the insulating solution contains 1.6 dibromohexane or bromobenzene, the electrolyte solution contains 60% by weight of $H_2O$, 30% by weight of 1,2-propanediol and 10% by weight of LiCl, based on the total weight of the electrolyte solution, and the insulating solution contains 83% by weight of a silicon oil and 17% by weight of 1,6-dibromohexane or bromobenzene, based on the total weight of the insulating solution.

6. The liquid according to any one of claims 2 to 5, wherein the difference in density between the electrolyte solution and the insulating solution is 0.01 $g/cm^3$ or less; and the difference in refractive index between the electrolyte solution and the insulating solution is in the range of 0.05 to 0.15 $n_D^{20}$.

7. A liquid lens module, comprising:
a transparent cover;
a case to accommodate an electrolyte solution and an insulating solution;
a pair of electrodes to supply electricity to the electrolyte solution; and
an insulating film to cover one of the electrodes in contact with the electrolyte solution,
wherein the electrolyte solution contains $H_2O$, 1,2-propanediol and LiCl, the insulating solution is a silicon (Si) oil, and the electrolyte solution contains 30 to 70% by weight of $H_2O$, 20 to 50% by weight of 1,2-propanediol and 5 to 30% by weight of LiCl, based on the total weight of the electrolyte solution.

8. The liquid lens module according to claim 7, wherein the insulating solution contains 1,6-dibromohexane or- bromobenzene.

9. A liquid lens module, comprising:
a transparent cover;
a case to accommodate an electrolyte solution and an insulating solution;
a pair of electrodes to supply electricity to the electrolyte solution; and
an insulating film to cover one of the electrodes in contact with the electrolyte solution,
wherein the electrolyte solution contains $H_2O$, 1,2-propanediol and LiCl, the insulating solution is a silicon (Si) oil, wherein the insulating solution contains 1,6-dibromohexane or bromobenzene, the electrolyte solution contains 30 to 70% by weight of $H_2O$, 20 to 50% by weight of 1,2-propanediol and 5 to 30% by weight of LiCl, based on the total weight of the electrolyte solution, and the insulating solution contains 75 to 90% by weight of a silicon oil and 10 to 25% by weight of 1,6-dibromohexane or bromobenzene, based on the total weight of the insulating solution.

10. The liquid lens module according to any one of claims 8 to 9, wherein the difference in density between the electrolyte solution and the insulating solution is 0.01 $g/cm^3$ or less; and the difference in refractive index between the electrolyte solution and the insulating solution is in the range of 0.05 to 0.15 $n_D^{20}$.

* * * * *

UNITED STATES PATENT AND TRADEMARK OFFICE
CERTIFICATE OF CORRECTION

| | | |
|---|---|---|
| PATENT NO. | : 7,656,588 B2 | Page 1 of 1 |
| APPLICATION NO. | : 11/505811 | |
| DATED | : February 2, 2010 | |
| INVENTOR(S) | : Jae Young Bae et al. | |

It is certified that error appears in the above-identified patent and that said Letters Patent is hereby corrected as shown below:

Title Page; item (57);
First Page, Column 2 (Abstract), Line 3, change "H20," to --$H_2O$,--.

First Page, Column 2 (Abstract), Line 11, change "H20," to --$H_20$,--.

Column 7, Line 28, change "1.6 dibromohexane" to --1,6-dibromohexane--.

Column 7, Line 42, change "1.6 dibromohexane" to --1,6-dibromohexane--.

Column 8, Line 21, change "or- bro-" to --or bro- --.

Column 8, Line 43, change "8 to 9," to --7 to 9,--.

Signed and Sealed this

Eighth Day of June, 2010

David J. Kappos
*Director of the United States Patent and Trademark Office*